US011507607B2

(12) United States Patent
Ganapathy et al.

(10) Patent No.: US 11,507,607 B2
(45) Date of Patent: Nov. 22, 2022

(54) SYSTEMS AND METHODS FOR DATABASE DYNAMIC QUERY MANAGEMENT BASED ON NATURAL LANGUAGE PROCESSING TECHNIQUES

(71) Applicant: Verizon Patent and Licensing Inc., Basking Ridge, NJ (US)

(72) Inventors: Ramya N. Ganapathy, Tamilnadu (IN); Gajendran Gnanasekar, Sivagangai (IN); Satish Kumar A. Dharmarpu, Ganjam (IN); Padmaja Swaminathan, Ambattur (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/921,268

(22) Filed: Jul. 6, 2020

(65) Prior Publication Data

US 2022/0004571 A1 Jan. 6, 2022

(51) Int. Cl.
*G06F 16/332* (2019.01)
*G06F 16/33* (2019.01)
*G06F 16/16* (2019.01)
*G06F 16/338* (2019.01)

(52) U.S. Cl.
CPC ........ *G06F 16/3329* (2019.01); *G06F 16/168* (2019.01); *G06F 16/338* (2019.01); *G06F 16/3326* (2019.01); *G06F 16/3334* (2019.01); *G06F 16/3344* (2019.01)

(58) Field of Classification Search
CPC .................................................. G06F 16/3329
See application file for complete search history.

(56) References Cited

U.S. PATENT DOCUMENTS

| | | | |
|---|---|---|---|
| 2003/0217069 A1* | 11/2003 | Fagin | G06F 16/258 |
| 2012/0191716 A1* | 7/2012 | Omoigui | H01L 27/14645 |
| | | | 707/740 |
| 2013/0195422 A1* | 8/2013 | Patil | H04N 21/6581 |
| | | | 386/E5.028 |
| 2015/0294013 A1* | 10/2015 | Ozer | G06Q 10/0639 |
| | | | 707/754 |
| 2017/0249356 A1* | 8/2017 | Hays | G06F 16/2272 |
| 2019/0156210 A1* | 5/2019 | He | G06F 16/903 |
| 2021/0350068 A1* | 11/2021 | Sanossian | G09B 21/001 |

* cited by examiner

*Primary Examiner* — Van H Oberly

(57) ABSTRACT

A system described herein may provide techniques for receiving natural language inputs at a live dashboard. The natural language inputs may be analyzed to identify entities such as keywords and to determine an intent associated with each input. The identified entities may be mapped to various database elements and a formatted database request may be generated based on the mapping and the identified entities. The formatted database request may be sent to an associated database and a database response may be received. The data included in the database response may be provided by generating a report using report attributes associated with the identified search intent.

20 Claims, 15 Drawing Sheets

SYSTEMS AND METHODS FOR DATABASE DYNAMIC QUERY MANAGEMENT BASED ON NATURAL LANGUAGE PROCESSING TECHNIQUES

BACKGROUND

Entities, such as organizations, institutions, or the like may utilize various database services to store and/or utilize data associated with various aspects of operation. Access to such database services typically requires knowledge of database-specific languages. In addition, retrieved data may be provided without context, thus requiring manual formatting and presentation.

DETAILED DESCRIPTION OF THE PREFERRED EMBODIMENTS

Figure 1:
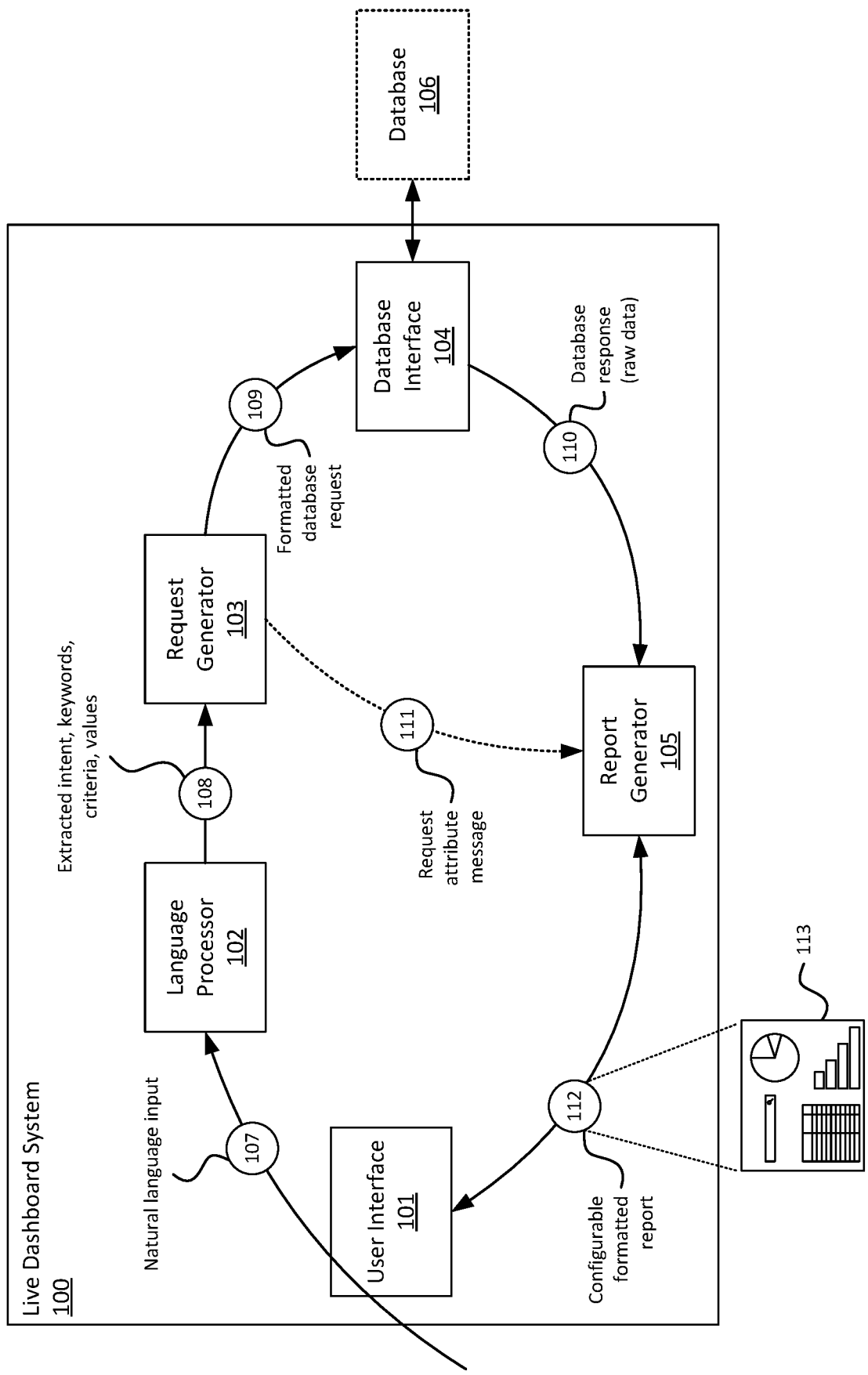
FIG. 1 illustrates an example overview of one or more embodiments described herein, in which a natural language input may be used to generate a database request and a formatted report.

The following detailed description refers to the accompanying drawings. The same reference numbers in different drawings may identify the same or similar elements.

Embodiments described herein provide for a live search and report generation dashboard that provides for database management using natural language techniques. The live dashboard may include a user interface ("UI") that may include a submission box or similar search input feature, and may implement natural language processing of received input, which may be in natural or colloquial language, as opposed to conforming to a particular structured language such as a database language, computer code, or the like. Such input may be analyzed using Natural Language Processing ("NLP") techniques to determine search intent, identify search or filter criteria, and/or otherwise generate or determine one or more database operations to perform based on the received input. Each search intent may map one or more natural language elements (e.g., a keyword) to one or more use cases, such as a set of associated database elements (e.g., one or more columns of a table). Search intents may be generated or configured using machine learning, received configuration information, default settings, and/or other appropriate ways.

A formatted database request may be generated based on the determined search intent and/or any associated criteria. The formatted database request may be provided to an associated database, and a response received. The response may include raw data, such as data values arranged in rows and columns, matching the specified intent and/or criteria.

Based on the response, the determined search intent, and/or any associated criteria, a report a report may be automatically generated. Such report generation may include selection of elements to include in the report, such as tables, charts, etc. In addition, report generation may include filtering of data. Further, report generation may include generating a layout of the selected elements for presentation via a user interface or other appropriate element. The report may be provided via the live dashboard.

Machine learning models may be used to generate, update, and/or otherwise configure various search intents and associated data mapping. Such configuration may include, for instance, specification of one or more keywords associated with each search intent. The configuration may include various mappings to one or more database elements. Such database elements, may include, for instance, table identifiers, column identifiers, functions, filters, etc. The data mapping may include various default mappings, related to common functions, values, etc. The configuration may include various mappings to one or more report attributes.

Attributes of the input, such as extracted words, phrases, and/or values may be compared to one or more models that are based on attributes such as search intent, words or phrases, and the like. The models may be generated using machine learning techniques and may be refined on an ongoing basis based on feedback after performing operations based on selection of report attributes and/or components (as indicated by the model). In some embodiments, configuration information may be received from an administrator or other user via a configuration dashboard. For instance, received configuration information may include keywords, associations of keywords to search intents, associations of database elements to search intents, and/or other relevant configuration information.

Figure 2:
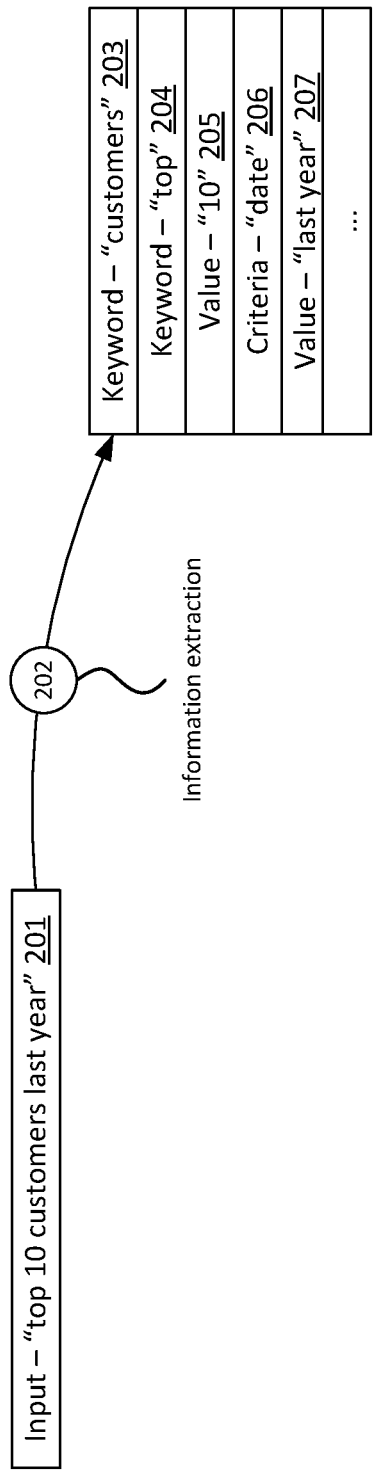
FIG. 2 illustrates example information extraction from a natural language input, in accordance with some embodiments.
Figure 3:
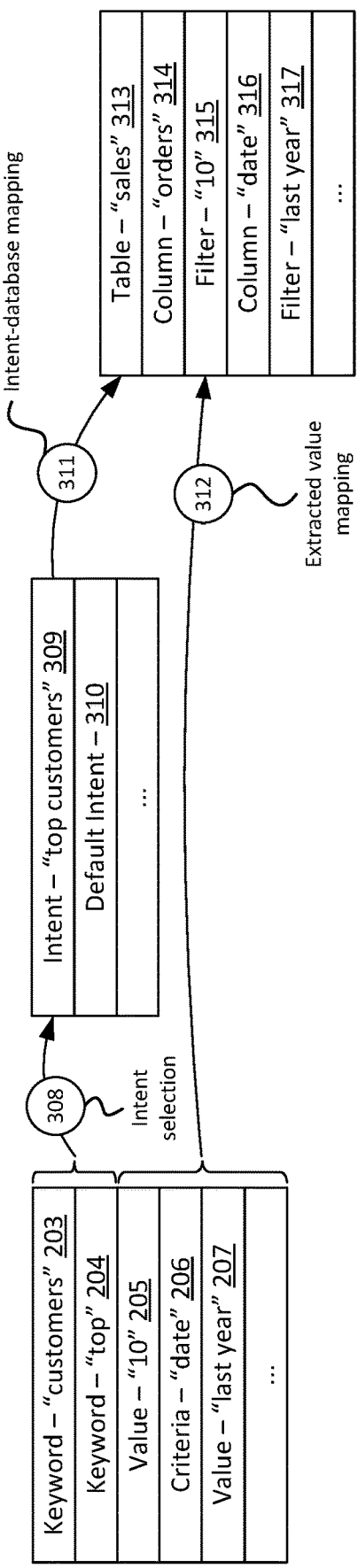
FIG. 3 illustrates example mapping of natural language input information to an input intent and mapping of input intent and extracted input information to database elements, in accordance with some embodiments.
Figure 4:
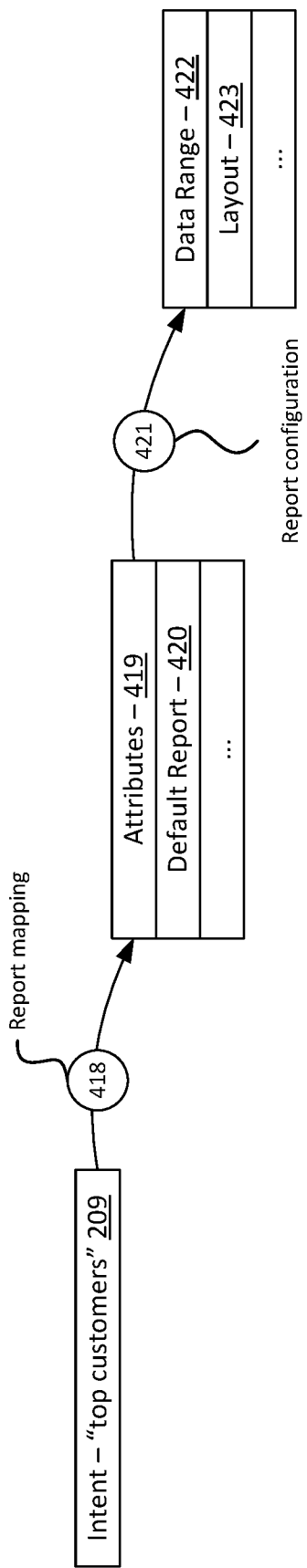
FIG. 4 illustrates example mapping of an input intent to report configuration elements, in accordance with some embodiments.

FIG. 1 provides an overview of some of the concepts discussed above. FIGS. 2-4 provide an overview of various mappings and data elements used by the components of FIG. 1, and will be described concurrently with FIG. 1 for the sake of explanation.

As shown in FIG. 1, live dashboard system 100 may include UI component 101, language processor 102, request generator 103, database interface 104, and report generator 105. Database 106 may be accessed via database interface 104. In some embodiments, database 106 may be implemented by an external device or system and accessed via an API. In some embodiments, database 106 may be implemented by live dashboard system 100. Live dashboard system 100 may be provided via a web page or an application.

As shown in FIG. 1, a natural language input 107 may be received via UI 101. UI 101 may include various appropriate elements, such as a search term input box, filter inputs (e.g., a date range or selection of one or more available databases to search), or the like. User interface 101 may include an API that may be accessed by another application or resource, such as an external portal or UI component. As shown in FIG. 2, the input in this example may include the text string "top 10 customers last year" 201.

As shown in FIG. 1, language processor 102 may receive natural language input 107 and may provide extracted intent, keywords, criteria, values, and/or other appropriate information 108. Such extracted information may be provided as a set of elements represented by a type or entity name (e.g., "function" or "column"), text strings or other values, and/or other appropriate sets of information.

As shown in FIG. 2, language processor 102 may perform information extraction 202 on input 201. Based on information extraction 202, language processor 102 may identify elements or language features such as keyword "customers" 203, keyword "top" 204, value "10" 205, criteria "date" 206, value "last year" 207, and/or other appropriate elements or features. Information may be extracted from input 201 in various appropriate ways. For instance, keywords 203-204 may be identified by comparing portions of input 201 to a listing of keywords and identifying matches or partial matches. As another example, numerical elements or specified phrases (e.g., "last year") may be identified as values 205 or 207 by comparing portions of input 201 to a listing of system entities. In some cases, information extraction may exclude or ignore extraneous words or phrases, such as "the", "a", etc. (sometimes referred to as "stop" words).

A single extracted element may be identified as multiple attributes. For instance, the word "year" may be a keyword associated with various reports or search intents (e.g., a yearly sales report). The word "year" may also denote a date value or range. The word "year" may be used to identify another feature, or associate a value to a feature (e.g., "year 2020" may cause value "2020" to be associated with a date feature).

Extracted information may be classified in various appropriate ways, depending on analysis of input 201. For instance, value 205 ("10") may be associated with keyword 204 ("top") because a "top" function is associated with a limit value, because the terms are adjacent in input 201, or because no other keywords or terms are associated with a numerical attribute. As another example, the text string "last year" included in input 201 may be associated with default keyword or criteria "date" 206 and value "last year" 207 (i.e., a date range).

Keywords 203-204 may include or may be associated with various synonyms, misspellings, grammatical variations, and/or other associated terms. For instance, "client", "clients", "clientele", "account", "accounts", and/or other similar terms may be included as keywords based on identification of keyword "customers" 203. As another example, keywords such as "best", "upper", etc. may be included as keywords based on identification of keyword "top" 204.

As shown in FIG. 3, intent selection 308 may include analysis of potential keywords and/or other information that may be associated with various available search intents. Each search intent may map one or more natural language elements (e.g., a keyword) to one or more use cases, such as a set of associated database elements (e.g., one or more columns of a table). Search intents may be associated with default or system-level entities or keywords (e.g., "top"), entities or keywords specific to live dashboard system 100 and/or database 106 (e.g., "customer"), and/or entities or keywords associated with usage sessions of live dashboard system 100. Intent selection 308 may identify multiple relevant intents including a "top customers" intent 309 and a default intent 310, and may select among the identified intents based on various relevant criteria, such as keyword matching, phrase matching, previous selection history, default rankings, etc. Each relevant intent may include a unique intent name or other identifier (e.g., intent "top customers" 309). Each intent may include (or refer to) various synonyms or other associated extracted elements or element classifications. For instance, inputs with elements such as "top clients", "top accounts", etc. may be mapped to intent "top customers" 309 via synonym lookup or other classification features.

In this example, intent selection 308 may be based on keywords 203-204, but different selection criteria may be used in different embodiments. For instance, an intent associated with monthly sales may be associated with a keyword such as "sales" or "month" or values such as "January". Various values or keywords such as "month" or "January" may be associated with other keywords such as "date" in order to identify relevant intents.

As shown in FIG. 1, request generator 103 may receive extracted intent, keywords, criteria, values, and/or other appropriate information 108 and may generate formatted database request 109. The request generator 103 may translate extracted text information 108 received from language processor 102 to one or more formatted database requests 109 that may be associated with any database type or syntax, database command, database query, and/or other database interactions.

The formatted database request 109 may be generated based on various appropriate settings or attributes. For instance, the request syntax and/or data formatting may be based on a type of database. The formatted database request may include various appropriate database elements or references.

As one example, a live dashboard system 100 associated with a structured query language ("SQL") database may generate a formatted database request 109 that include elements such as a "where" clauses, "column" clauses or indicators, "service" selections or indicators, "table" selections or indicators (or other groups or sets of rows and/or columns), "between" clauses, "conjunction" clauses, "function" clauses, and/or other appropriate elements (e.g., row number limitations). Other types of system in place of a SQL database may also be used.

As shown in FIG. 3, intent-database mapping 311 and/or extracted value mapping 312 may include identification of various database elements including, for instance, table "sales" 313, column "orders" 314, filter "10" 315, column "date" 316, and filter "last year" 317.

In this example intent-database mapping 311 may identify a table or other data source 313 and a primary column 314 (e.g., the column used to rank results). Different embodiments may include various appropriate intent-database mappings 311. For instance, such mappings may include identification of multiple tables or other data sources. As another example, mappings may include multiple columns that may be specified in a particular hierarchy or matrix.

Extracted value mapping 312 may be used to identify filter parameters 315 and 317 and/or columns 316 or other database elements associated with the filter parameters 315 or 317. For example, filter "10" 315 may be applied to a ranking sorted by column "orders" 314 such that only ten results are requested, while filter "last year" 317 may be applied to column "date" 316 such that only elements associated with dates in that range are requested.

The various elements 313-317 associated with the intent-database mapping 311 and/or extracted value or other parameter mapping 312 may be used by request generator 103 to generate formatted database request 109. The various entities 313-317 may be segregated in various ways, such as by type. Entity types may include, for instance, functions, tables, columns, services, values, dates, numbers, etc. Some entities may be automatically identified based on other entities (e.g., a column entity and value may be used to search for a table). Multiple entities may be identified in some cases (e.g., a column name may be included in or match multiple tables). Relationships among tables may be analyzed to determine which table(s) to include in a formatted database request 109. The formatted database request 109 may include various filters, such as a where clause filter, a column name filter, a service key filter, a date range filter, a conjunction filter, a function filter, a number filter, and/or other appropriate filters defined based on intent based on entities 313-317 and/or other entities.

Intent-database mapping 311 and extracted value mapping 312 will be discussed in more detail in reference to FIGS. 5-8 below.

In the example of FIG. 3, intent "top customers" 309 may be associated with a default value—column "orders" 314. Depending on the received input 201, a different intent may be selected or intent 309 may be modified to reflect an input-specific value rather than the default value. For instance, if an input 201 for "top 10 customers last year by total sales" was received, a selected intent may refer to a database element such as "sales" or "total sales", rather than the default column "orders" 314.

As shown in FIG. 1, database interface 104 may receive the formatted database request 109, send the request to database 106, and receive a response from database 106. In some embodiments, database interface 104 may be associated with multiple databases 106, which may have various associated syntax, available commands or queries, structures or identifiers, and/or other appropriate attributes. Database interface 104 may send a database response 110 that includes "raw data" (i.e., a matrix of data values arranged by rows and columns). Database response 110 may be filtered or otherwise limited to include data associated with the formatted database request 109. In addition to data associated with a specific request, default information may be included in formatted database request 109 and/or database response 110. For instance, a response from database 106 may include various default information, regardless of the content of the request. Such default information may include columns or values such as entry name, entry identifier, date modified, etc.

Report generator 105 may receive database response 110 from database interface 104. Report generator 106 may receive an optional request attribute message 111 from request generator 103. Request attribute message 111 may include information related to the extracted intent, keywords, criteria, and/or values 108 that the report generator 105 may utilize to generate a relevant report. Such information may include, for instance, a set of columns to be included in a chart or table. Various report components or attributes may be determined or generated automatically based on database response 110. For instance, the data included in database response 110 may be analyzed to determine a minimum and maximum value that may be applied to a chart axis. As another example, if a set of columns include a common keyword or term (e.g., "January Sales", "February Sales", etc.), the common term may be used to label an axis (e.g., "Sales" or "Sales by Month").

As shown in FIG. 4, intent "top customers" 309 may be associated with report mapping 418, indicating an associated set of report attributes 419. In addition, default report 420 and/or other relevant information may be determined by report generator 105, received in request attribute message 111, and/or otherwise generated. If no report attributes 419 are specified in request attribute message 111, report generator 105 may select default report components based on database response 110, such as number of rows or columns of raw data, table name, primary column name, and/or other relevant information.

Each set of report attributes 419 or report type 420 may be associated with a report configuration 421 including various associated parameters, layouts, components, etc. that may be used to generate a report. For example, each report configuration 421 may include a data range 422 (e.g., a list of rows and columns), a layout 423 (e.g., indications of chart types and relative positions), and/or other relevant information that may be associated with report generation or presentation.

Report generator 105 may generate and send a configurable formatted report 112 to user interface 101. A displayed report 113 may include elements such as an input box for natural language inputs, tables, graphs, charts, and/or other appropriate representations of data, arranged into a particular layout. User interface 101 may provide report 113 via user interface 101. Report 113 may be provided in various appropriate ways, depending on an input source and/or other relevant factors. For instance, a natural language input 107 received via a web portal may be associated with a report displayed via the same web portal. As another example, a natural language input 107 received from an application via an API may be associated with a response sent via the API.

Figure 5:
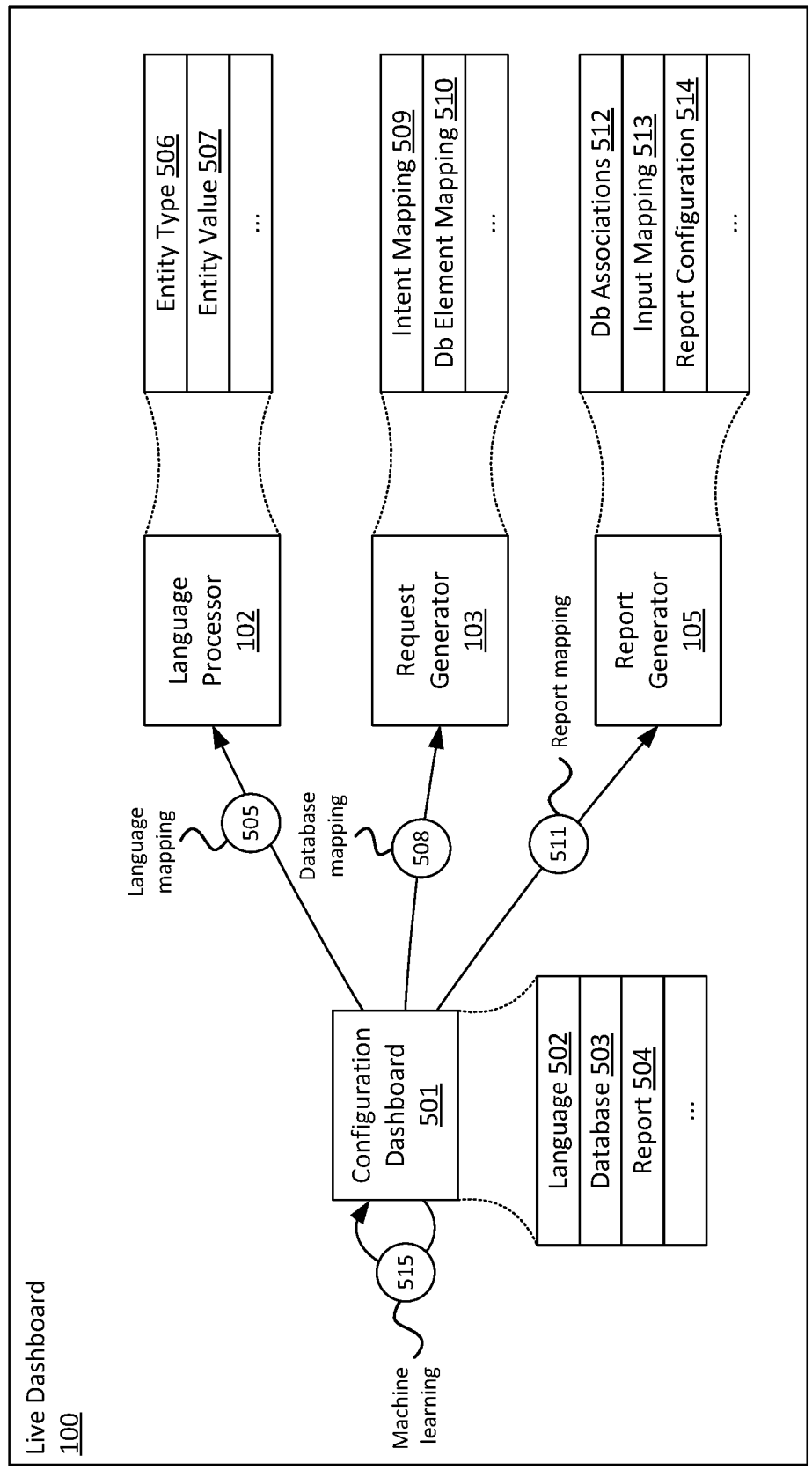
FIG. 5 illustrates an example overview of one or more embodiments described herein, in which configuration settings are applied to input processing, request generation, and report generation, in accordance with some embodiments.
Figure 6:
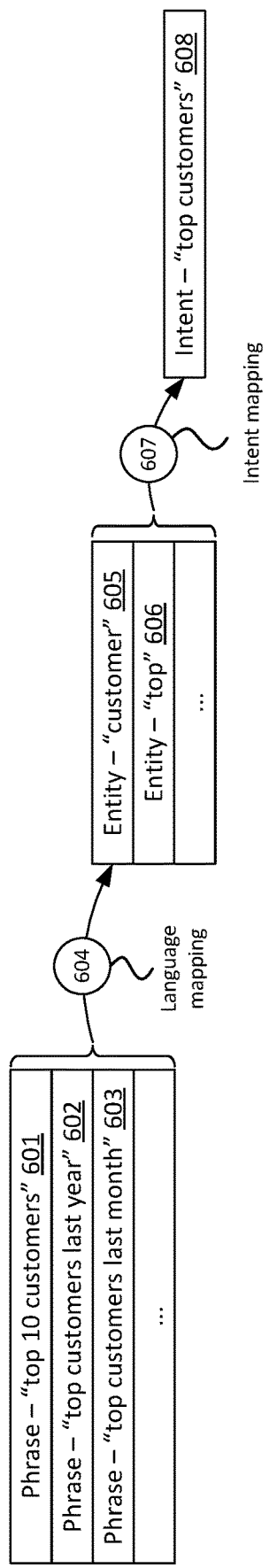
FIG. 6 illustrates example mapping of phrases to natural language entities and input intent, in accordance with some embodiments.
Figure 7:
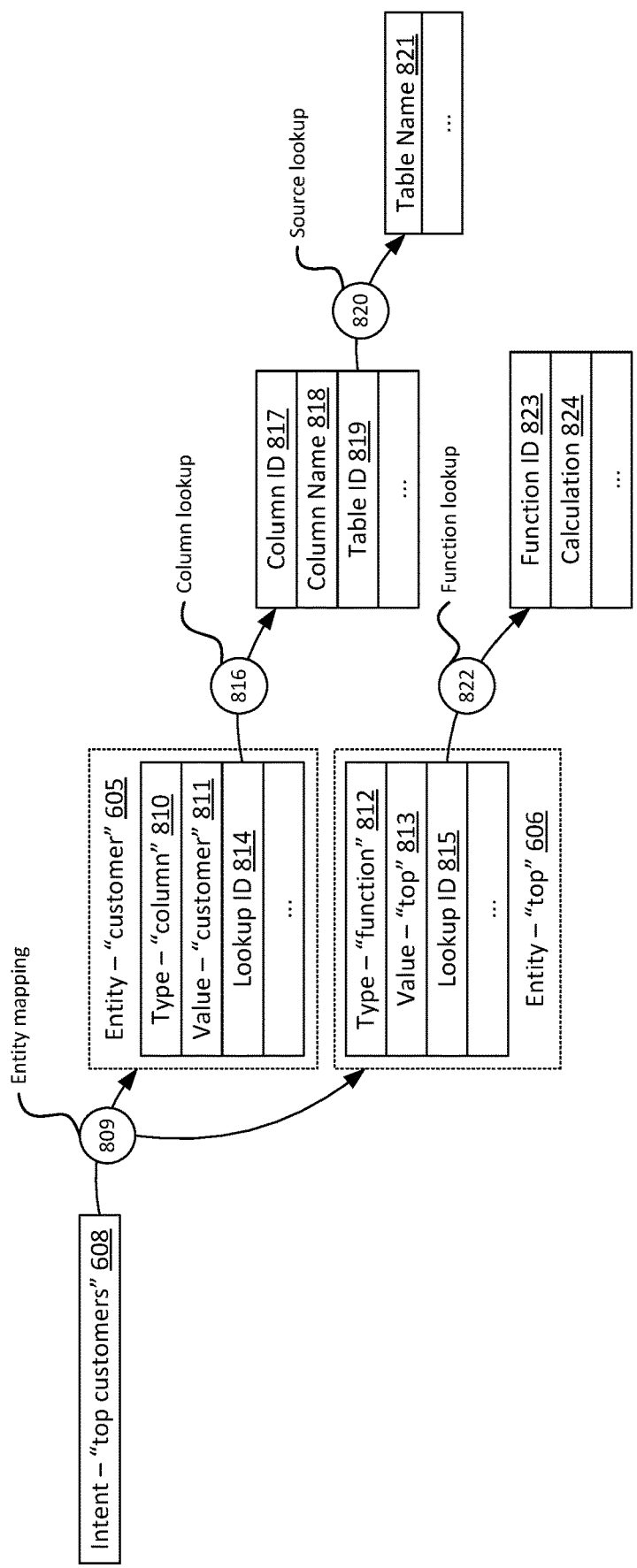
FIG. 7 illustrates example mapping of natural language input information to an input intent and mapping of input intent and extracted input information to database elements, in accordance with some embodiments.
Figure 8:
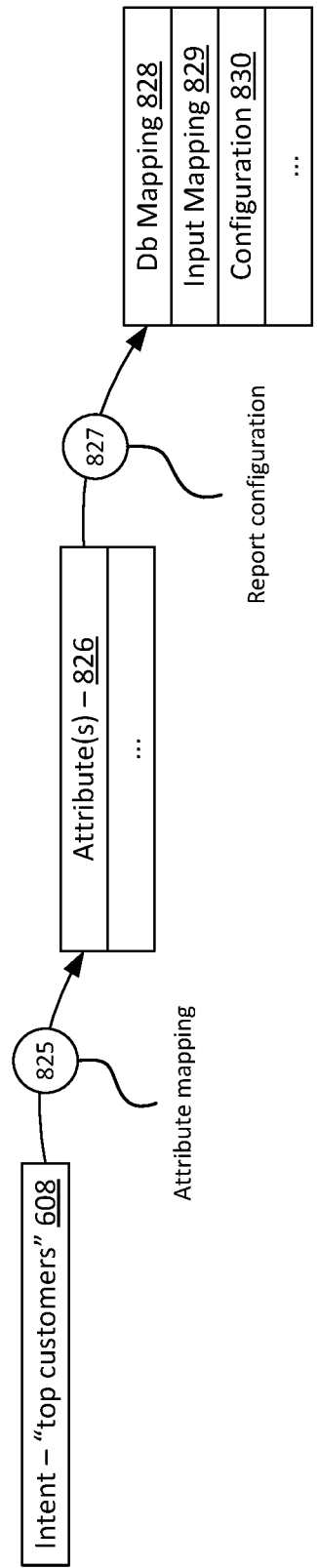
FIG. 8 illustrates example mapping of an input intent to report attributes and report configuration elements, in accordance with some embodiments.

FIG. 5 provides an overview of configuration setting and machine learning. FIGS. 6-8 provide an overview of various mappings and data elements used by the components of FIG. 5, and will be described concurrently with FIG. 5 for the sake of explanation.

As shown in FIG. 5, live dashboard system 100 may include configuration dashboard 501. Configuration dashboard 501 may be accessed via UI 101 or a similar interface. Configuration dashboard 501 may receive configuration settings related to language 502, one or more associated databases 503, various reports 504, and/or other appropriate settings.

Language settings 502 may include information related to elements associated with natural language processing including definition of entities and intents and selection of intents (and/or generation of new intents). Configuration dashboard 501 may generate a language mapping 505 and provide language mapping 505 (and/or other appropriate data) to language processor 102, where language mapping 505 may include, or be associated with, one or more entities, each entity associated with an entity type 506 (e.g., "column" or "function"), an entity value 507 (e.g., "customers" or "top"), and/or other relevant information.

Thus, as shown in the example of FIG. 6, various training phrases 601-603 may be used to generate a language mapping 604 to one or more associated entities 605-606. In this example, phrases such as "top 10 customers" 601, "top customers last year" 602, and "top customers last month" 603 may be mapped 604 to entity "customer" 605 and entity "top" 606. Such entities 605-606 may be defined automatically based on analysis of training phrases 601-603 and/or may be generated manually by an administrator or other appropriate resource.

As shown in FIG. 5, configuration dashboard 501 may generate database mapping 508 and provide database mapping 508 (and/or other appropriate data) to request generator 103, where database mapping 508 may include intent mapping 509, database element mapping 510, and/or other appropriate information. Intent mapping 509 may include association between intents and various entities associated with language processing. For instance, as shown in FIG. 6, intent mapping 607 may associate intent "top customers" 608 with entities "customer" 605 and "top" 606 (and/or other appropriate natural language entities).

As shown in FIG. 5, database element mapping 510 may provide references to various database elements, such as columns, tables, functions, etc. For example, as shown in FIG. 7, entity mapping 709 may be used to look up entities associated with an intent, where the language entities may be associated with various database elements. For example, intent "top customers" 608 may be mapped 709 to entity "customer" 605 and entity "top" 606. In this example, entity mapping 709 is an inverse of intent mapping 607. In some embodiments, entities that are not associated with a specific intent may be identified based on analysis of a received input. For instance, if a search input for "top customers by net sales" was received, and the term "net" matches a function entity that is not associated with intent "top customers" 608, the "net" function may be mapped 709 to intent "top customers" 608 in addition to entities 605-606.

Each entity 605-606 may be associated with a type, value, lookup ID, and/or other relevant information. Entity types may include, for instance, database references such as services, tables or other data sources, columns, etc. Entity types may include functions or calculations, pre-defined filters or limits, clauses, lookup elements, and/or other appropriate entities. For instance, in this example, entity "customer" 605 is associated with type "column" 710 and value "customer" 711, while entity "top" 606 is associated with type "function" 712 and value "top" 713.

Each lookup ID 714-715 may refer to various elements associated with database references or natural language processing, as appropriate for the entity type. For instance, column lookup 716 may be performed based on lookup ID 714, where column lookup 716 indicates column ID 717. Column ID 717 may be associated with various other elements, such as column name 718, table ID 719, and/or other appropriate information.

Table ID 719 may refer to a database table or other appropriate data source. A source lookup 720 may be performed based on table ID 719, indicating table name 721, where the identified table may be associated with other relevant information. Such associated information may include, for instance, a set of default columns to include in a database response, default filter information, etc.

Function lookup 722, based on lookup ID 715, may indicate function UD 723, associated with calculation or data manipulation 724 and/or other appropriate information. For instance, entity "top" 606 may be associated with a sort operation.

As shown in FIG. 5, configuration dashboard 501 may generate a report mapping 511 and provide report mapping 511 (and/or other appropriate data) to report generator 105, where report mapping 511 may include database associations 512, input mapping 513, report configuration 514, and/or other appropriate information. Database associations 512 may include references to columns, tables, and/or other database elements to be included in the report. For instance, a set of rows or columns may be specified for use as chart labels. As another example, a set of column names may be specified to be included in a generated report, if available. Input mapping 513 may include associations of input entities, such as keywords, with various reports or report types. For instance, an input including the keyword "top" may be associated with a set of "top" report attributes, while an input including the keyword "average" may be associated with a set of "average" report attributes.

As shown in FIG. 8, report mapping 825 may associate an intent with a report name or identifier and/or other appropriate information. For instance, intent "top customers" 608 may be associated with report attributes 826. Report attributes 826 may include or refer to a report configuration 827 that indicates database mapping 828, input mapping 829, and configuration information 830.

Database mapping 828 may indicate a set of columns (e.g., by listing column names or IDs), data sources (e.g., one or more table IDs), and/or other appropriate database references that may associate such database elements with one or more elements of a report. For instance, a set of columns may be specified to be included in a chart. As another example, a set of charts may be specified for each of multiple related data sources (e.g., sales may be grouped into database tables by region and a multi-region report may include a sales chart associated with each region).

Input mapping 829 may indicate various settings or filters to apply to a report based on a received input. For instance, if input "top 10 customers" is received, the value "10" may be applied to report selection and/or generation such that all customer names are listed in a chart. In contrast, if input "top 100 customers" is received, customer names may be omitted from the chart and included in a separate table.

Configuration information 830 may include layout information, chart type (or other presentation type) indication, selection of graphic elements or features, etc. In some embodiments, reports may provide reconfiguration options or capabilities. For instance, various chart type options may be included in a generated report and provided for selection via UI 101. As another example, reconfigurable filters may be provided, such that a date range, for instance, may be adjusted. In some embodiments, updated inputs may be applied as report reconfigurations rather than as additional requests for data. For instance, a search input for "top 100 customers" may be used to generate a report. If an updated input for "top 10 customers" is then received, a filter may be applied to previously-received data related to the top 100 customers such that only information associated with the top 10 customers is presented in an updated report.

As shown in FIG. 5, machine learning 515 may be applied to various configuration settings applied via configuration dashboard 501. For instance, sets of inputs 107 received via UI 101 and associated extracted information 108 generated by language processor 102 may be analyzed 515 to determine whether additional keywords or entities should be generated and/or should be associated with various intents. For example, if a number of inputs for "top clients" are received and a default report is presented, then follow-up inputs for "top customers" are received and an associated intent-specific report is provided, keyword "customer" may be updated to include "client" as a synonym. As another example, if a number of inputs for "average monthly revenue" are followed by inputs for "median monthly revenue", an "average" function associated with a "monthly revenue" intent may be updated to refer to a median function rather than a mean function.

As another example, if many requests associated with a specific intent configuration are received, a new intent may be generated based on machine learning 515. For instance, if many inputs 107 for "top 10 customers" are received and matched to an intent such as "top customers", a new intent (or sub-intent) may be generated and/or may be associated with a new or different report.

Machine learning 515 may be applied to intent-database mapping such that formatted database requests 109 generated by request generated 103 may be analyzed 515 to determine whether intent-database mappings should be generated or updated based on received inputs 107 and/or report configuration information. For instance, if a "top customers" intent is associated with an "orders" column and many updated inputs 107 for "top customers by sales" are received, a "sales" column may be associated with the "top customers" intent, if available.

Similarly, machine learning 515 may be applied to, for instance, report generation and/or presentation 112 performed by report generator 105 and UI 101. Thus, for instance, if a default chart type (e.g., bar chart) is associated with a report, and a number of selections of an alternative option (e.g., pie chart) is received the default chart type for the report may be updated (e.g., from a bar chart to a pie chart).

Various other appropriate attributes and/or information may be associated with machine learning 515. For instance, machine learning 515 may consider temporal aspects, such as whether an updated input 107 was received within a short amount of time, indicating that the provided report 113 did not match input intent. As another example, machine learning 515 may analyze similarity of inputs 107, where similar inputs (e.g., inputs with matching keywords) may indicate dissatisfaction with provided reports 113 and dissimilar inputs may indicate satisfaction with a provided report. In some embodiments, feedback or customer support records may be analyzed to determine whether similar questions were raised. If a user is dissatisfied with provided results (e.g., as indicated by successive similar inputs), the selection models may be updated to reduce the likelihood of the same report or report attributes being selected or generated based on the identified intent, and/or reduce the likelihood of the identified intent being mapped to attributes of the input. Similarly, if positive feedback is received (e.g., as indicated by no further inputs being received within a threshold amount of time or of a completely different input being received), the selection models may be updated such that the identified search intent and/or report are more likely to be selected or generated based on similar inputs or input elements.

Figure 9:
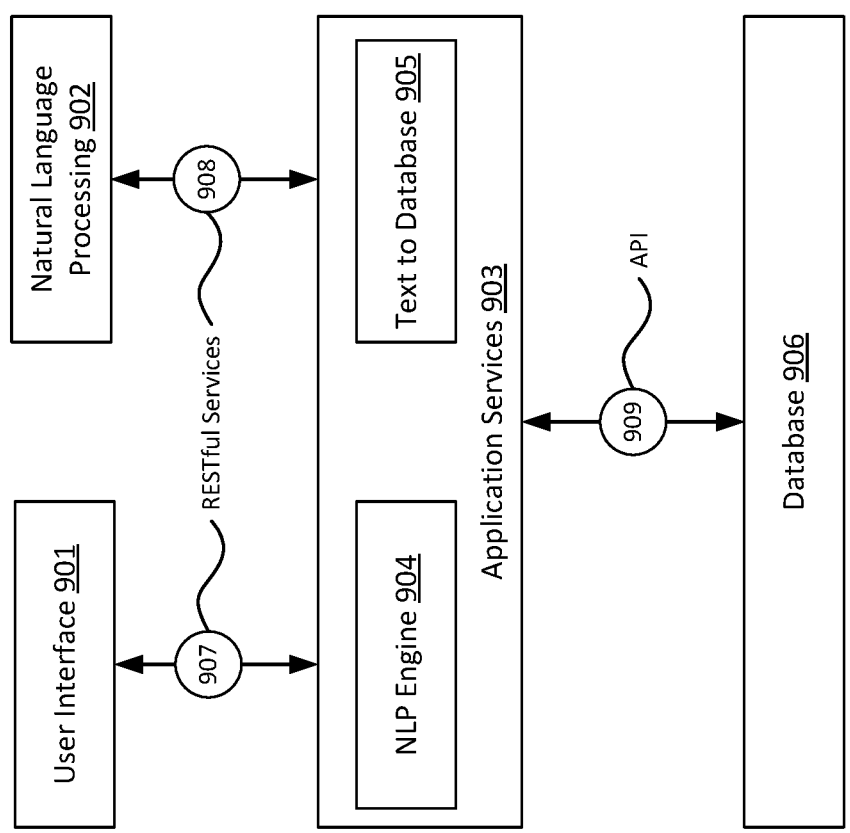
FIG. 9 illustrates example components of a live dashboard system, in accordance with some embodiments.

FIG. 9 illustrates example components of live dashboard system 100. As shown, live dashboard system 100 may include user interface 901, natural language processing 902, application services 903 including natural language processing engine 904 and text to database 905, and database 906.

User interface 901 may include, or be implemented by, various interfaces, applications, browsers, and/or other appropriate resources. User interface 901 may include, or implement, user interface 101 and report generator 105. Natural language processing 902 may include, or implement, language processor 102. Natural language processing engine 904 may include, or implement, request generator 103. Text to database 905 may include, or implement, request generator 103. Database 906 may include, or implement, database 106.

User interface 901 may interact with application services 903 via Representational State Transfer ("RESTful") services interface 907 such as JavaScript Object Notation ("JSON"). Similarly, natural language processing 902 may interact with application services 903 over a RESTful services interface 908, such as JSON.

Application services 903 may interact with database 906 over API 909 or other appropriate interface. API 909 may include, for instance, database management libraries such as, for example, Java Database Connectivity ("JDBC") resources such as "C3P0" or Java Persistence API ("JPA").

Figure 10:
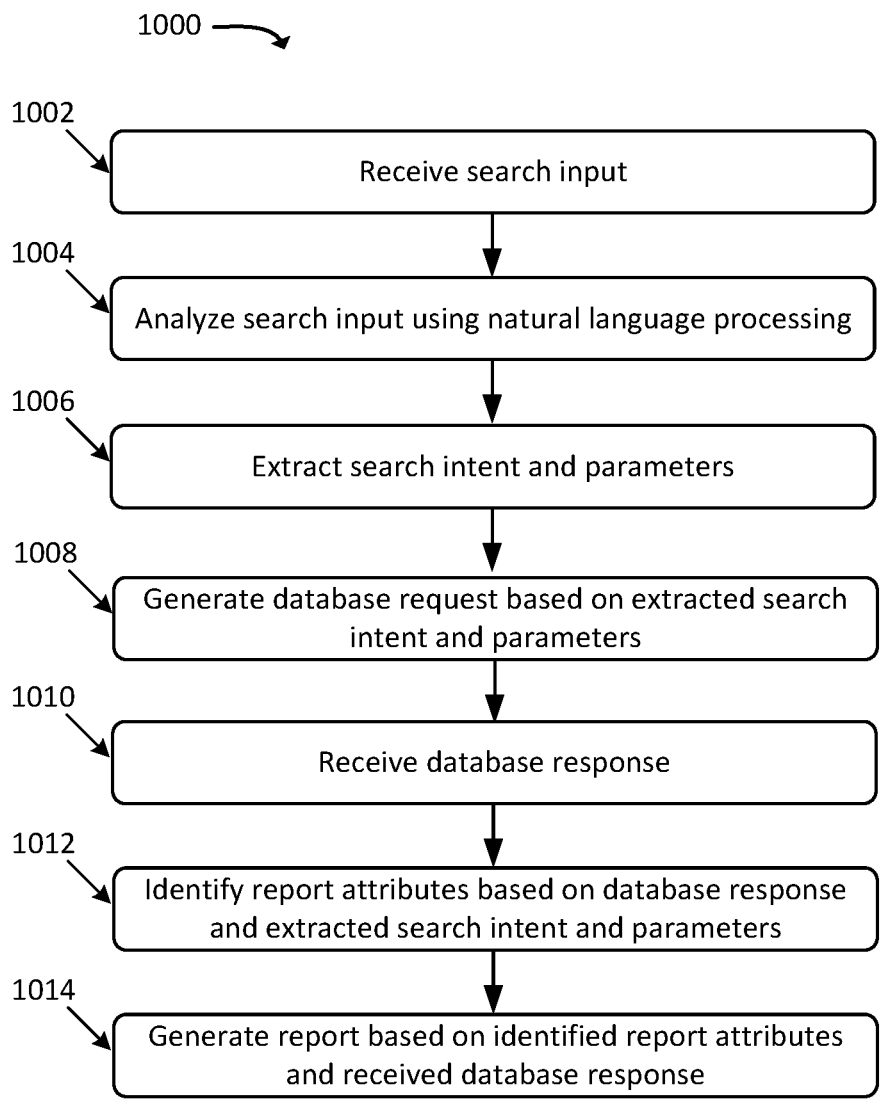
FIG. 10 illustrates an example process for executing a database request and generating a report based on a received input, in accordance with some embodiments.

FIG. 10 illustrates an example process 1000 for executing a database request and generating a report based on a received input. In some embodiments, some or all of process 1000 may be performed by live dashboard system 100. In some embodiments, one or more other devices may perform some or all of process 1000 (e.g., in concert with, and/or in lieu of, live dashboard system 100).

As shown, process 1000 may include receiving (at 1002) a search input. Such an input may be received via UI 101. The search input may include a text string, an audio stream, a request message, and/or other appropriate types of elements. The received search input may be processed in various appropriate ways (e.g., by performing a speech-to-text conversion).

Process 1000 may further include analyzing (at 1004) the search input using natural language processing. As described above, language processor 102 may analyze the received input to identify one or more entities included in the input. Such analysis may include, for instance, separating a received input into sub-elements based on some specified delimiters (e.g., a comma or a space) or other appropriate criteria.

Process 1000 may additionally include extracting (at 1006) search intent and parameters based on the input analysis. For instance, sub-elements of the received input, and/or combinations of sub-elements, may be compared to various natural language entities (e.g., via text matching) to identify relevant entities. Relevant entities may be used to identify relevant search intents (e.g., via keyword matching) and relevant parameters based on the relevant intents. If no relevant or matching intents are identified, a default intent may be selected based on various relevant factors, such as partial keyword matching, default intent rankings, etc.

Process 1000 may also include generating (at 1008) a database request based on the extracted search intent and parameters. The database request may be generated by request generator 103 and may include a where clause filter, a column name filter, a service key filter, a date range filter, a conjunction filter, a function filter, a number filter, and/or other appropriate filters formatted using appropriate syntax for a particular database.

Process 1000 may further include receiving (at 1010) a database response to the request. Such a response may include data that satisfies the request (i.e., data that matches the filters included in the request). The response may be formatted as rows and columns of data values.

Process 1000 may additionally include identifying (at 1012) report attributes based on the database response and/or the extracted search intent and parameters. For instance, a set of report attributes may be associated with each search intent and report components may be selected and/or arranged based on the identified search intent. As another example, report attributes may be selected or identified based on amount of data included in a database response.

Process 1000 may also include generating (at 1014) a report based on the identified report attributes and the received database response. The report may be generating by applying the received data values to the selected report components (e.g., by associated a range of cells with a chart included in the report). In some embodiments, the generated report may be updated or formatted based on various relevant factors, such as analysis of data values, configuration settings, user preferences, etc.

Figure 11:
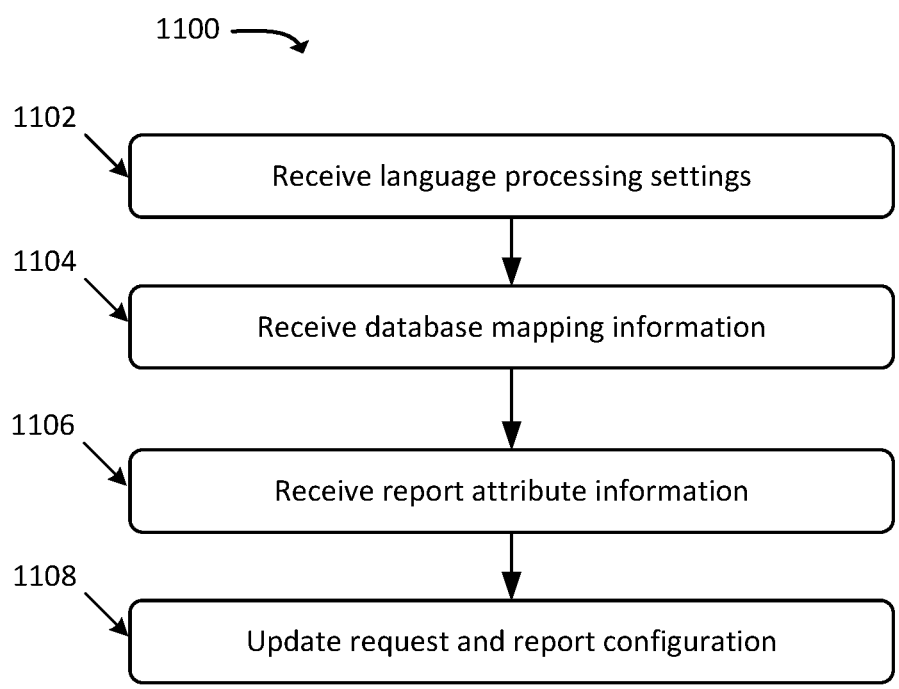
FIG. 11 illustrates an example process for generating and applying configuration settings, in accordance with some embodiments.

FIG. 11 illustrates an example process 1100 for generating and applying configuration settings. In some embodiments, some or all of process 1100 may be performed by live dashboard system 100. In some embodiments, one or more other devices may perform some or all of process 1100 (e.g., in concert with, and/or in lieu of, live dashboard system 100).

As shown, process 1100 may include receiving (at 1102) language processing settings. Such settings may be received via a resource such as UI 101. Language processing settings may include intent configurations and entity definitions. Training phrases may be used to associate various entities or keywords with a particular search intent. Entity definitions may include elements such as type (e.g., function or column) and value (e.g., a function or column name). Entity definitions may include listings of synonyms or similar elements that may be used to match portions of an input to various entities and associated intents.

Process 1100 may further include receiving (at 1104) database mapping information. Database mapping information may utilize, for instance, lookup IDs or other appropriate references to various database elements, such as columns, functions, etc.

Process 1100 may additionally include receiving (at 1106) report attribute information. Such information may include associating one or more columns with each search intent. Each report attribute may include database mapping information and input mapping information such that data received from the database is properly associated with the report components. The report attributes may specify selection and layout of components to be included in the report. Such components may include, for instance, tables, graphs, charts, etc.

Process 1100 may also include updating (at 1108) request and report configuration information. Such update may include sending or otherwise applying the configuration information to live dashboard resources such as language processing, request generation, and report selection and generation.

Figure 12:
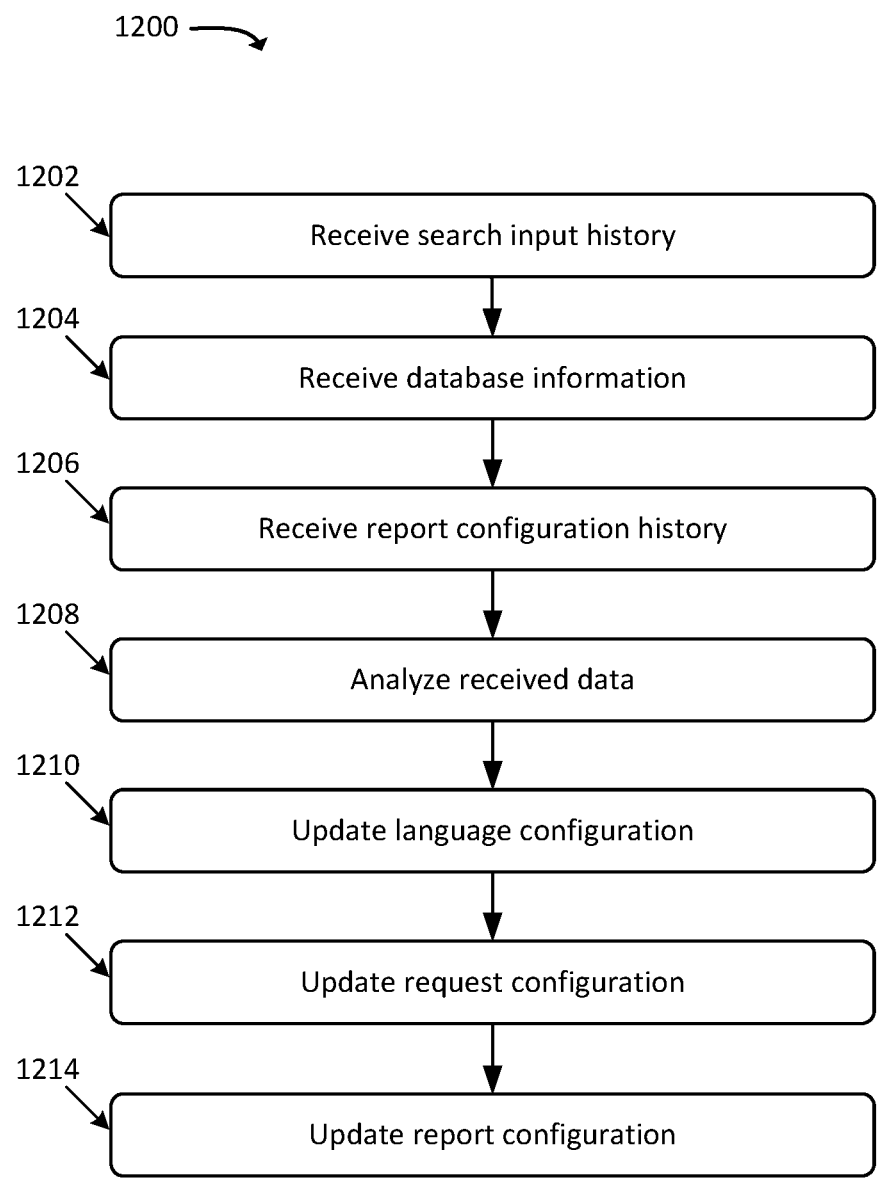
FIG. 12 illustrates an example process for applying machine learning to input processing and report generation, in accordance with some embodiments.

FIG. 12 illustrates an example process 1200 for applying machine learning to input processing and report generation. In some embodiments, some or all of process 1200 may be performed by live dashboard system 100. In some embodiments, one or more other devices may perform some or all of process 1200 (e.g., in concert with, and/or in lieu of, live dashboard system 100).

As shown, process 1200 may include receiving (at 1202) search input history. In some embodiments, each received search input may be stored in a log for retrieval and analysis. The search input history may include information such as submitted inputs and associated information such as user identity or input source, database or data source associated with an input, identified intents and parameters, and/or other appropriate information.

Process 1200 may further include receiving (at 1204) database information. Such information may include, for instance, a listing of data sources such as table, listings of associated columns, numbers of rows or other entries, reference information such as column or table IDs, etc.

Process 1200 may additionally include receiving (at 1206) report configuration history. Such history may include, for instance, selection history from available reports, option selections or updates, and/or updated search inputs based on report presentation.

Process 1200 may further include analyzing (at 1208) the received data. Such analysis may include, for instance, comparing final report selections (e.g., by notating reports that are printed or saved) to input content, identified entities, database associations and/or other relevant information.

Process 1200 may also include updating (at 1210) language configuration settings. Such updates may include, for instance, updates to existing or creation of new entity or intent definitions. Such updates may include updates to associations between intents and entities.

Process 1200 may further include updating (at 1212) request configuration settings. Such updates may include, for instance, updates to database references included in various entities or intents.

Process 1200 may additionally include updating (at 1214) report configuration settings. Such updates may include, for instance, updates to associations between intents and report attributes, updates to report content or formatting, updates to report layouts, etc.

Figure 13:
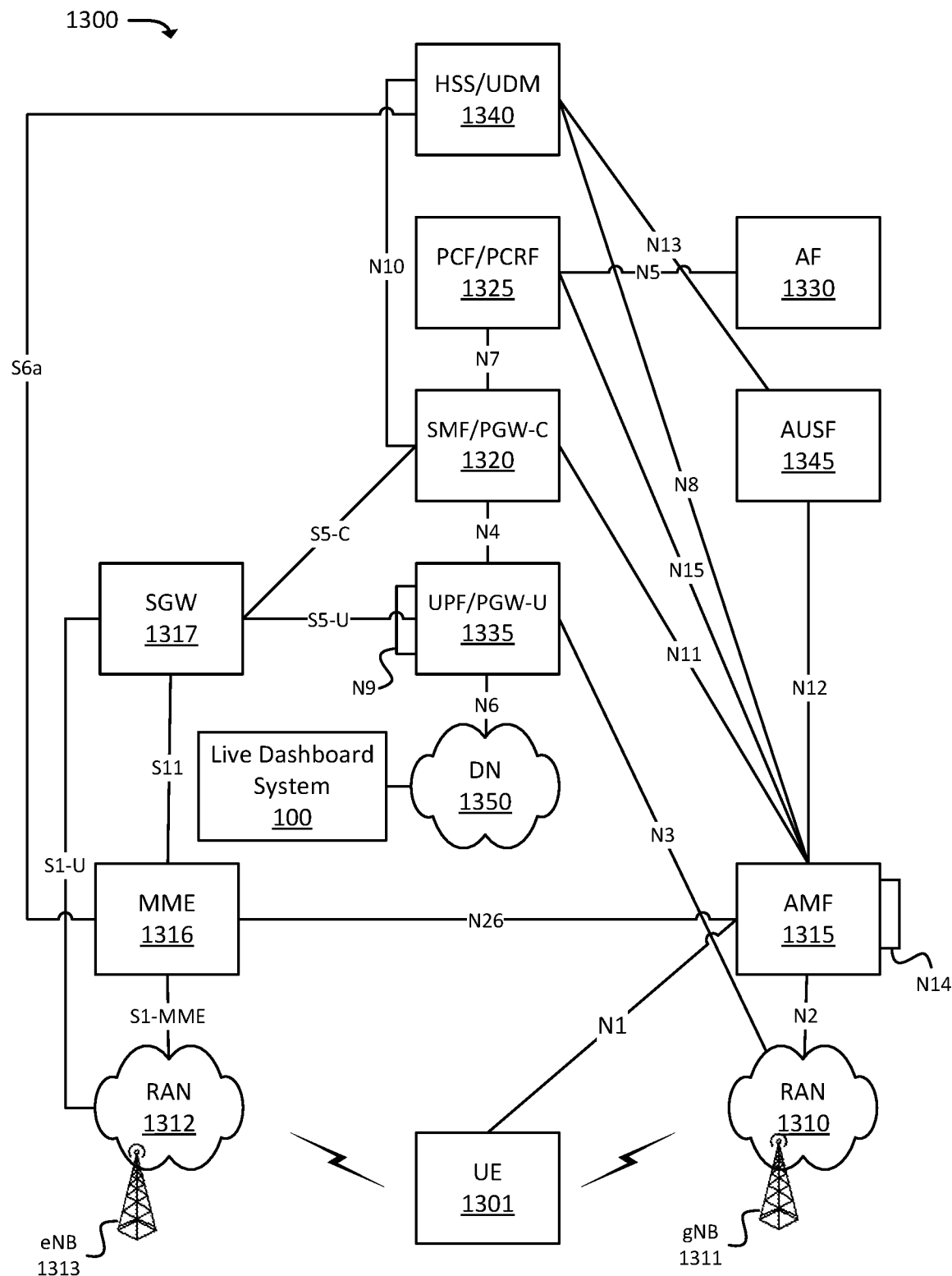
FIG. 13 illustrates an example environment in which one or more embodiments, described herein, may be implemented.

FIG. 13 illustrates an example environment 1300, in which one or more embodiments may be implemented. In some embodiments, environment 1300 may correspond to a Fifth Generation ("5G") network, and/or may include elements of a 5G network. In some embodiments, environment 1300 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1300 may include user equipment ("UE") 1301, radio access network ("RAN") 1310 (which may include one or more Next Generation Node Bs ("gNBs") 1311), RAN 1312 (which may include one or more one or more evolved Node Bs ("eNBs") 1313), Access and Mobility Management Function ("AMF") 1315, Session Management Function ("SMF")/Packet Data Network ("PDN") Gateway ("PGW")-Control plane function ("PGW-C") 1320, Policy Control Function ("PCF")/Policy Charging and Rules Function ("PCRF") 1325, Application Function ("AF") 1330, User Plane Function ("UPF")/PGW-User plane function ("PGW-U") 1335, Home Subscriber Server ("HSS")/Unified Data Management ("UDM") 1340, Authentication Server Function ("AUSF") 1345, live dashboard system 100, and Data Network ("DN") 1350.

The quantity of devices and/or networks, illustrated in FIG. 13, is provided for explanatory purposes only. In practice, environment 1300 may include additional devices and/or networks, fewer devices and/or networks, different devices and/or networks, or differently arranged devices and/or networks than illustrated in FIG. 13. For example, while not shown, environment 1300 may include devices that facilitate or enable communication between various components shown in environment 1300, such as routers, modems, gateways, switches, hubs, etc. Alternatively, or additionally, one or more of the devices of environment 1300 may perform one or more functions described as being performed by another one or more of the devices of environment 1300. Devices of environment 1300 may interconnect with each other and/or other devices via wired connections, wireless connections, or a combination of wired and wireless connections. In some implementations, one or more devices of environment 1300 may be physically integrated in, and/or may be physically attached to, one or more other devices of environment 1300.

UE 1301 may include a computation and communication device, such as a wireless mobile communication device that is capable of communicating with RAN 1310, RAN 1312, and/or DN 1350. UE 1301 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 1301 may send traffic to and/or receive traffic (e.g., user plane traffic) from DN 1350 via RAN 1310, RAN 1312, and/or UPF/PGW-U 1335.

RAN 1310 may be, or may include, a 5G RAN that includes one or more base stations (e.g., one or more gNBs 1311), via which UE 1301 may communicate with one or more other elements of environment 1300. UE 1301 may communicate with RAN 1310 via an air interface (e.g., as provided by gNB 1311). For instance, RAN 1310 may receive traffic (e.g., voice call traffic, data traffic, messaging traffic, signaling traffic, etc.) from UE 1301 via the air interface, and may communicate the traffic to UPF/PGW-U 1335, and/or one or more other devices or networks. Similarly, RAN 1310 may receive traffic intended for UE 1301 (e.g., from UPF/PGW-U 1335, AMF 1315, and/or one or more other devices or networks) and may communicate the traffic to UE 1301 via the air interface.

RAN 1312 may be, or may include, an LTE RAN that includes one or more base stations (e.g., one or more eNBs 1313), via which UE 1301 may communicate with one or more other elements of environment 1300. UE 1301 may communicate with RAN 1312 via an air interface (e.g., as provided by eNB 1313). For instance, RAN 1310 may receive traffic (e.g., voice call traffic, data traffic, messaging traffic, signaling traffic, etc.) from UE 1301 via the air interface, and may communicate the traffic to UPF/PGW-U 1335, and/or one or more other devices or networks. Similarly, RAN 1310 may receive traffic intended for UE 1301 (e.g., from UPF/PGW-U 1335, SGW 1317, and/or one or more other devices or networks) and may communicate the traffic to UE 1301 via the air interface.

AMF 1315 may include one or more devices, systems, Virtualized Network Functions ("VNFs"), etc., that perform operations to register UE 1301 with the 5G network, to establish bearer channels associated with a session with UE 1301, to hand off UE 1301 from the 5G network to another network, to hand off UE 1301 from the other network to the 5G network, and/or to perform other operations. In some embodiments, the 5G network may include multiple AMFs 1315, which communicate with each other via the N14 interface (denoted in FIG. 13 by the line marked "N14" originating and terminating at AMF 1315).

SGW 1317 may include one or more devices, systems, VNFs, etc., that aggregate traffic received from one or more eNBs 1313 and send the aggregated traffic to an external network or device via UPF/PGW-U 1335. Additionally, SGW 1317 may aggregate traffic received from one or more UPF/PGW-Us 1335 and may send the aggregated traffic to one or more eNBs 1313. SGW 1317 may operate as an anchor for the user plane during inter-eNB handovers and as an anchor for mobility between different telecommunication networks or RANs (e.g., RANs 1310 and 1312).

SMF/PGW-C 1320 may include one or more devices, systems, VNFs, etc., that gather, process, store, and/or provide information in a manner described herein. SMF/PGW-C 1320 may, for example, facilitate in the establishment of communication sessions on behalf of UE 1301. In some embodiments, the establishment of communications sessions may be performed in accordance with one or more policies provided by PCF/PCRF 1325.

PCF/PCRF 1325 may include one or more devices, systems, VNFs, etc., that aggregate information to and from the 5G network and/or other sources. PCF/PCRF 1325 may receive information regarding policies and/or subscriptions from one or more sources, such as subscriber databases and/or from one or more users (such as, for example, an administrator associated with PCF/PCRF 1325).

AF 1330 may include one or more devices, systems, VNFs, etc., that receive, store, and/or provide information that may be used in determining parameters (e.g., quality of service parameters, charging parameters, or the like) for certain applications.

UPF/PGW-U 1335 may include one or more devices, systems, VNFs, etc., that receive, store, and/or provide data (e.g., user plane data). For example, UPF/PGW-U 1335 may receive user plane data (e.g., voice call traffic, data traffic, etc.), destined for UE 1301, from DN 1350, and may forward the user plane data toward UE 1301 (e.g., via RAN 1310, SMF/PGW-C 1320, and/or one or more other devices). In some embodiments, multiple UPFs 1335 may be deployed (e.g., in different geographical locations), and the delivery of content to UE 1301 may be coordinated via the N9 interface (e.g., as denoted in FIG. 13 by the line marked "N9" originating and terminating at UPF/PGW-U 1335). Similarly, UPF/PGW-U 1335 may receive traffic from UE 1301 (e.g., via RAN 1310, SMF/PGW-C 1320, and/or one or more other devices), and may forward the traffic toward DN 1350. In some embodiments, UPF/PGW-U 1335 may communicate (e.g., via the N4 interface) with SMF/PGW-C 1320, regarding user plane data processed by UPF/PGW-U 1335.

HSS/UDM 1340 and AUSF 1345 may include one or more devices, systems, VNFs, etc., that manage, update, and/or store, in one or more memory devices associated with AUSF 1345 and/or HSS/UDM 1340, profile information associated with a subscriber. AUSF 1345 and/or HSS/UDM 1340 may perform authentication, authorization, and/or accounting operations associated with the subscriber and/or a communication session with UE 1301.

Live dashboard system 100 may include one or more devices, systems, VNFs, etc. that perform one or more operations described above. For example, live dashboard system may include one or more servers that receive inputs 107, generate database requests 109, and provide formatted reports 112 via a web portal 101. As another example, live dashboard system 100 may include a UE 1301 running an application that performs various operations associated with live dashboard 100.

DN 1350 may include one or more wired and/or wireless networks. For example, DN 1350 may include an Internet Protocol ("IP")-based PDN, a wide area network ("WAN") such as the Internet, a private enterprise network, and/or one or more other networks. UE 1301 may communicate, through DN 1350, with data servers, other UEs 1301, and/or to other servers or applications that are coupled to DN 1350. DN 1350 may be connected to one or more other networks, such as a public switched telephone network ("PSTN"), a public land mobile network ("PLMN"), and/or another network. DN 1350 may be connected to one or more devices, such as content providers, applications, web servers, and/or other devices, with which UE 1301 may communicate.

Figure 14:
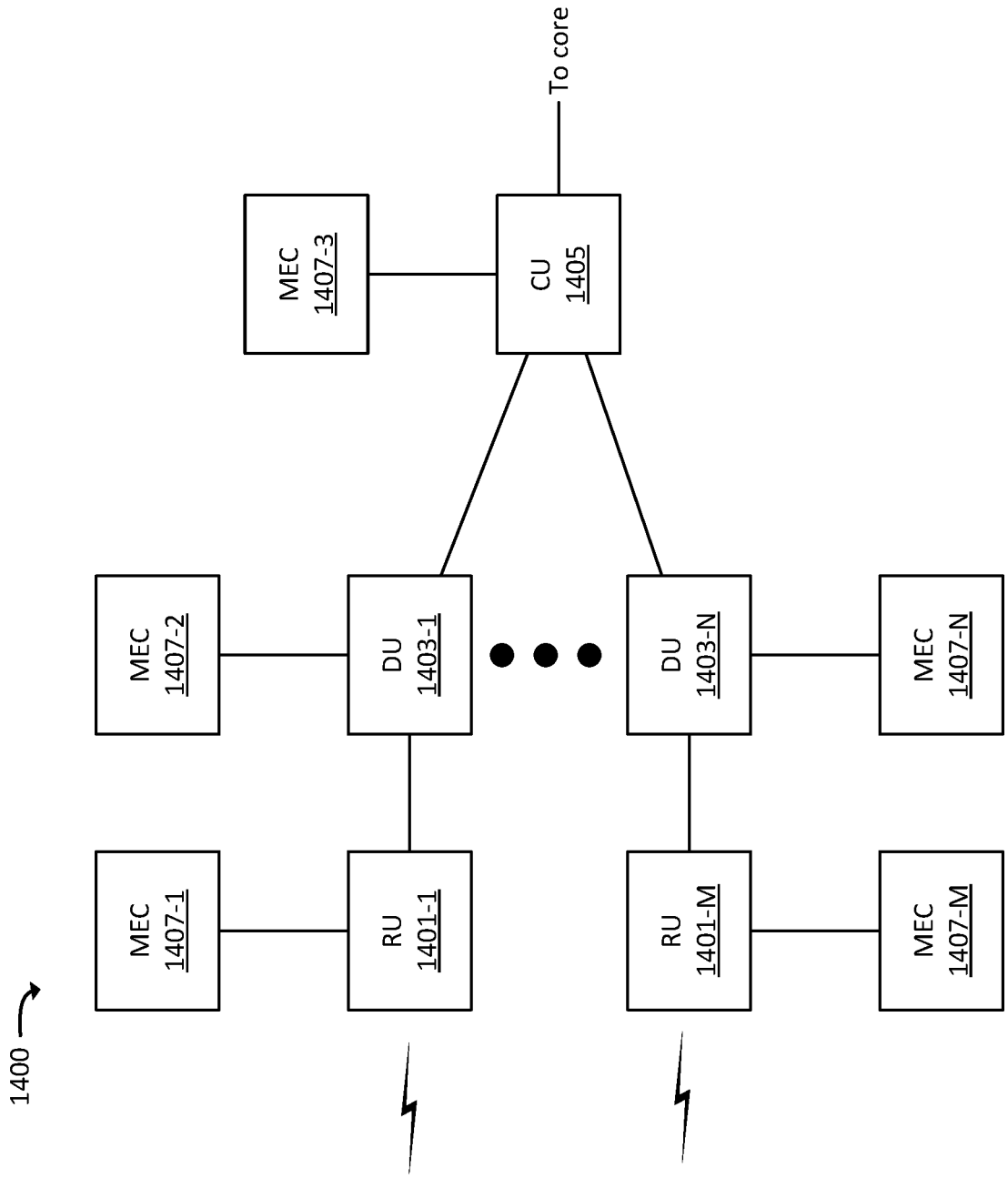
FIG. 14 illustrates an example arrangement of a radio access network ("RAN"), in accordance with one or more embodiments.

FIG. 14 illustrates an example Distributed Unit ("DU") network 1400, which may be included in and/or implemented by one or more RANs (e.g., RAN 1310). In some embodiments, a particular RAN may include one DU network 1400. In some embodiments, a particular RAN may include multiple DU networks 1400. In some embodiments, DU network 1400 may correspond to a particular gNB 1311 of a 5G RAN (e.g., RAN 1310). In some embodiments, DU network 1400 may correspond to multiple gNBs 1311. In some embodiments, DU network 1400 may correspond to one or more other types of base stations of one or more other types of RANs. As shown, DU network 1400 may include Control Unit ("CU") 1405, one or more Distributed Units ("DUs") 1403-1 through 1403-N (referred to individually as "DU 1403," or collectively as "DUs 1403"), and one or more Remote Units ("RUs") 1401-1 through 1401-M (referred to individually as "RU 1401," or collectively as "RUs 1401").

CU 1405 may communicate with a core of a wireless network (e.g., may communicate with one or more of the devices or systems described above with respect to FIG. 13, such as AMF 1315 and/or UPF/PGW-U 1335). In the uplink direction (e.g., for traffic from UEs 1301 to a core network), CU 1405 may aggregate traffic from DUs 1403, and forward the aggregated traffic to the core network. In some embodiments, CU 1405 may receive traffic according to a given protocol (e.g., Radio Link Control ("RLC")) from DUs 1403, and may perform higher-layer processing (e.g., may aggregate/process RLC packets and generate Packet Data Convergence Protocol ("PDCP") packets based on the RLC packets) on the traffic received from DUs 1403.

In accordance with some embodiments, CU 1405 may receive downlink traffic (e.g., traffic from the core network) for a particular UE 1301, and may determine which DU(s) 1403 should receive the downlink traffic. DU 1403 may include one or more devices that transmit traffic between a core network (e.g., via CU 1405) and UE 1301 (e.g., via a respective RU 1401). DU 1403 may, for example, receive traffic from RU 1401 at a first layer (e.g., physical ("PHY") layer traffic, or lower PHY layer traffic), and may process/aggregate the traffic to a second layer (e.g., upper PHY and/or RLC). DU 1403 may receive traffic from CU 1405 at the second layer, may process the traffic to the first layer, and provide the processed traffic to a respective RU 1401 for transmission to UE 1301.

RU 1401 may include hardware circuitry (e.g., one or more RF transceivers, antennas, radios, and/or other suitable hardware) to communicate wirelessly (e.g., via an RF interface) with one or more UEs 1301, one or more other DUs 1403 (e.g., via RUs 1401 associated with DUs 1403), and/or any other suitable type of device. In the uplink direction, RU 1401 may receive traffic from UE 1301 and/or another DU 1403 via the RF interface and may provide the traffic to DU 1403. In the downlink direction, RU 1401 may receive traffic from DU 1403, and may provide the traffic to UE 1301 and/or another DU 1403.

RUs 1401 may, in some embodiments, be communicatively coupled to one or more Multi-Access/Mobile Edge Computing ("MEC") devices, referred to sometimes herein simply as ("MECs") 1407. For example, RU 1401-1 may be communicatively coupled to MEC 1407-1, RU 1401-M may be communicatively coupled to MEC 1407-M, DU 1403-1 may be communicatively coupled to MEC 1407-2, DU 1403-N may be communicatively coupled to MEC 1407-N, CU 1405 may be communicatively coupled to MEC 1407-3, and so on. MECs 1407 may include hardware resources (e.g., configurable or provisionable hardware resources) that may be configured to provide services and/or otherwise process traffic to and/or from UE 1301, via a respective RU 1401. In some embodiments, one or more MECs 1407 may include and/or implement some or all of the functionality described above with respect to live dashboard system 100.

For example, RU 1401-1 may route some traffic, from UE 1301, to MEC 1407-1 instead of to a core network (e.g., via DU 1403 and CU 1405). MEC 1407-1 may process the traffic, perform one or more computations based on the received traffic, and may provide traffic to UE 1301 via RU 1401-1. In this manner, ultra-low latency services may be provided to UE 1301, as traffic does not need to traverse DU 1403, CU 1405, and an intervening backhaul network between DU network 1400 and the core network.

Figure 15:
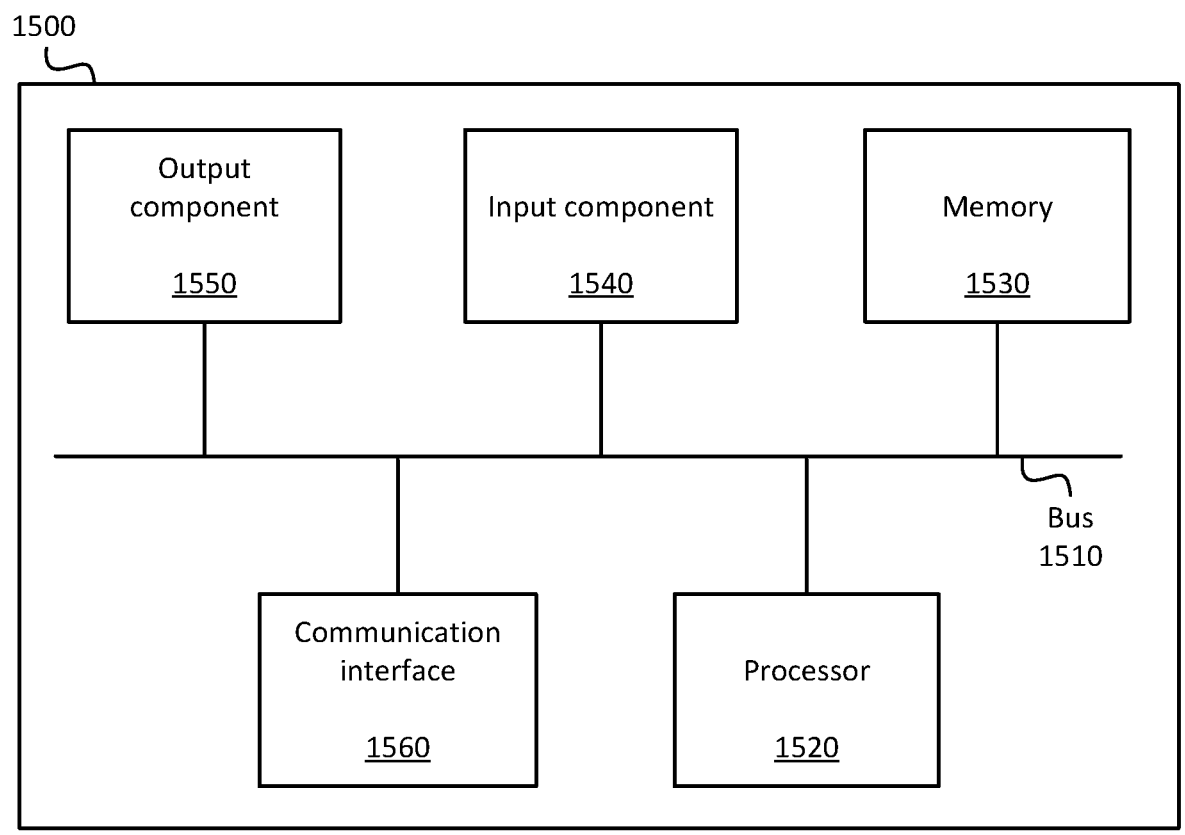
FIG. 15 illustrates example functional components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-13), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   generate a plurality of machine learning models that each correspond a set of search intents to a respective set of filters;
   receive an input via a user interface ("UI") element associated with a UI;
   analyze the input to identify a search intent and a set of parameters associated with the input;
   generate a database request based on the identified search intent and the set of parameters;
   receive a response to the database request including a plurality of search results from a particular database that were identified based on the database request;
   compare the identified search intent to search intents of the plurality of machine learning models;
   select, based on the comparing, a particular machine learning model of the plurality of machine learning models, wherein selecting the particular machine learning model includes identifying a particular set of filters that correspond to the particular machine learning model;
   generate the report based on the plurality of search results and further based on the particular set of filters that correspond to the particular machine learning model, wherein the report includes only a subset of the plurality of search results based on the particular set of filters; and
   present the report via the UI.

2. The device of claim 1, wherein analyzing the input comprises:
   identifying a set of natural language entities associated with the input; and determining the search intent by matching at least one natural language entity from the set of natural language entities to at least one entity associated with the search intent.

3. The device of claim 2, wherein each natural language entity is mapped to one or more database tables and at least one function.

4. The device of claim 1, and wherein the one or more processors are further configured to:
receive user feedback after presenting the report; and
modify at least one of the one or more machine learning models based on the received feedback.

5. The device of claim 4, wherein:
receiving the user feedback includes receiving a subsequent input within a threshold amount of time after presenting the report,
an identified search intent associated with the subsequent input is the same as the search intent associated with the input, and
the at least of the one or more machine learning models are modified based on receiving the input associated with the identified search intent and the subsequent input associated with the identified search intent within the threshold amount of time.

6. The device of claim 1, wherein the one or more processors are further configured to select a particular presentation type from a plurality of candidate presentation types based on the identified search intent and the set of parameters, for the report.

7. The device of claim 6, wherein the plurality of candidate presentation types include a plurality of types of charts, wherein the particular presentation type includes a particular type of chart of the plurality of types of charts.

8. A non-transitory computer-readable medium, storing a plurality of processor-executable instructions to:
generate a plurality of machine learning models that each correspond a set of search intents to a respective set of filters;
receive an input via a user interface ("UI") element associated with a UI;
analyze the input to identify a search intent and a set of parameters associated with the input;
generate a database request based on the identified search intent and the set of parameters;
receive a response to the database request including a plurality of search results from a particular database that were identified based on the database request;
compare the identified search intent to search intents of the plurality of machine learning models;
select, based on the comparing, a particular machine learning model of the plurality of machine learning models, wherein selecting the particular machine learning model includes identifying a particular set of filters that correspond to the particular machine learning model;
generate the report based on the plurality of search results and further based on the particular set of filters that correspond to the particular machine learning model, wherein the report includes only a subset of the plurality of search results based on the particular set of filters; and
present the report via the UI.

9. The non-transitory computer-readable medium of claim 8, wherein analyzing the input comprises:
identifying a set of natural language entities associated with the input; and
determining the search intent by matching at least one natural language entity from the set of natural language entities to at least one entity associated with the search intent.

10. The non-transitory computer-readable medium of claim 9, wherein each natural language entity is mapped to one or more database tables and at least one function, wherein the one or more data tables are each associated with at least one column that is mapped to each natural language entity, and wherein the at least one function is mapped to a set of function values.

11. The non-transitory computer-readable medium of claim 8, wherein the plurality of processor-executable instructions are further to:
receive user feedback after presenting the report; and
modify at least one of the one or more machine learning models based on the received feedback.

12. The non-transitory computer-readable medium of claim 11, wherein:
the user feedback includes a subsequent input within a threshold amount of time after presenting the report,
an identified search intent associated with the subsequent input is the same as the search intent associated with the input, and
the at least of the one or more machine learning models are modified based on receiving the input associated with the identified search intent and the subsequent input associated with the identified search intent within the threshold amount of time.

13. The non-transitory computer-readable medium of claim 8, wherein the plurality of processor-executable instructions further include processor-executable instructions to select a particular presentation type from a plurality of candidate presentation types based on the identified search intent and the set of parameters, for the report.

14. The non-transitory computer-readable medium of claim 13, wherein the plurality of candidate presentation types include a plurality of types of charts, wherein the particular presentation type includes a particular type of chart of the plurality of types of charts.

15. A method, comprising:
generating a plurality of machine learning models that each correspond a set of search intents to a respective set of filters;
receiving an input via a user interface ("UI") element associated with a UI;
analyzing the input to identify a search intent and a set of parameters associated with the input;
generating a database request based on the identified search intent and the set of parameters;
receiving a response to the database request including a plurality of search results from a particular database that were identified based on the database request;
comparing the identified search intent to search intents of the plurality of machine learning models;
selecting, based on the comparing, a particular machine learning model of the plurality of machine learning models, wherein selecting the particular machine learning model includes identifying a particular set of filters that correspond to the particular machine learning model;
generating the report based on the plurality of search results and further based on the particular set of filters that correspond to the particular machine learning model, wherein the report includes only a subset of the plurality of search results based on the particular set of filters; and
presenting the report via the UI.

16. The method of claim 15, wherein analyzing the input comprises:
- identifying a set of natural language entities associated with the input; and
- determining the search intent by matching at least one natural language entity from the set of natural language entities to at least one entity associated with the search intent.

17. The method of claim 16, wherein each natural language entity is mapped to one or more database tables and at least one function, wherein the one or more data tables are each associated with at least one column that is mapped to each natural language entity.

18. The method of claim 15, wherein the method further comprises:
- receiving user feedback after presenting the report; and
- modifying at least one of the one or more machine learning models based on the received feedback, wherein:
  - receiving the user feedback includes receiving a subsequent input within a threshold amount of time after presenting the report;
  - an identified search intent associated with the subsequent input is the same as the search intent associated with the input; and
  - the at least of the one or more machine learning models are modified based on receiving the input associated with the identified search intent and the subsequent input associated with the identified search intent within the threshold amount of time.

19. The method of claim 15, further comprising selecting a particular presentation type from a plurality of candidate presentation types based on the identified search intent and the set of parameters, for the report.

20. The method of claim 19, wherein the plurality of candidate presentation types include a plurality of types of charts, wherein the particular presentation type includes a particular type of chart of the plurality of types of charts.

* * * * *